(12) United States Patent
Slusar

(10) Patent No.: US 9,372,093 B2
(45) Date of Patent: *Jun. 21, 2016

(54) REVERSE NATURAL GUIDANCE

(71) Applicant: Navteq B.V., Veldhoven (NL)

(72) Inventor: Mark Slusar, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 47 days.

This patent is subject to a terminal disclaimer.

(21) Appl. No.: 14/258,205

(22) Filed: Apr. 22, 2014

(65) Prior Publication Data
US 2014/0229110 A1    Aug. 14, 2014

Related U.S. Application Data

(63) Continuation of application No. 13/430,199, filed on Mar. 26, 2012, now Pat. No. 8,744,771.

(51) Int. Cl.

| G01C 21/36 | (2006.01) |
|---|---|
| G01C 21/34 | (2006.01) |
| G06F 3/01 | (2006.01) |
| G08G 1/0968 | (2006.01) |
| G06F 17/30 | (2006.01) |
| G10L 15/26 | (2006.01) |
| G10L 15/22 | (2006.01) |
| G06F 17/00 | (2006.01) |
| G01C 21/00 | (2006.01) |

(52) U.S. Cl.
CPC ........ *G01C 21/3608* (2013.01); *G01C 21/3484* (2013.01); *G01C 21/36* (2013.01); *G01C 21/3664* (2013.01); *G06F 3/017* (2013.01); *G06F 17/30386* (2013.01); *G08G 1/096894* (2013.01); *G01C 21/00* (2013.01); *G06F 17/00* (2013.01); *G08G 1/096872* (2013.01); *G10L 15/22* (2013.01); *G10L 15/265* (2013.01)

(58) Field of Classification Search
None
See application file for complete search history.

(56) References Cited

U.S. PATENT DOCUMENTS

| 8,538,760 | B2 * | 9/2013 | Khorashadi et al. | 704/275 |
|---|---|---|---|---|
| 2006/0058947 | A1 * | 3/2006 | Schalk | 701/207 |
| 2007/0067088 | A1 * | 3/2007 | Baig | 701/96 |
| 2010/0082232 | A1 * | 4/2010 | Lee | 701/201 |
| 2010/0114471 | A1 * | 5/2010 | Sugiyama et al. | 701/200 |
| 2011/0050589 | A1 * | 3/2011 | Yan et al. | 345/173 |
| 2011/0054772 | A1 | 3/2011 | Rossio et al. | |
| 2011/0202862 | A1 * | 8/2011 | Kramer et al. | 715/771 |
| 2013/0091971 | A1 * | 4/2013 | Helot et al. | 74/473.3 |
| 2013/0131986 | A1 * | 5/2013 | Van Seggelen et al. | 701/533 |

FOREIGN PATENT DOCUMENTS

JP    2010145262    7/2010

OTHER PUBLICATIONS

Holscher et al., Would you Follow Your Own Route Description, Cognitive Strategies in Uran Route Planning, 2011, pp. 228-247, vol. 121, journal, Cognition.
International Search Report and Written Opinions for Related application No. PCT/EP2013/053749, Mailed May 13, 2013.
Marge et al., Comparing Spoken Language Route Instructions for Robots Across Environment Representations, Sep. 24-25, 2010, pp. 157-164, proceedings of SIGDIAL 2010: The 11th Annual Meeting of the Special Interest Group on Discourse and Dialogue.

* cited by examiner

*Primary Examiner* — Jason Holloway
(74) *Attorney, Agent, or Firm* — Lempia Summerfield Katz LLC

(57) ABSTRACT

The disclosed embodiments relate to recognition of navigation and/or guidance related information within an expressed conversational narrative between a provider of the narrative and a receiver thereof. The recognized navigation and/or guidance related information is then converted into navigation data which may be used to present a navigation route and/or guidance information related thereto to the receiver.

20 Claims, 3 Drawing Sheets

REVERSE NATURAL GUIDANCE

REFERENCE TO RELATED APPLICATIONS

This application is a continuation under 37 C.F.R. § 1.53(b) of U.S. patent application Ser. No. 13/430,199 filed Mar. 26, 2012 now U.S. Pat. No.8,744,771, the entire disclosure of which is hereby incorporated by reference.

BACKGROUND

Navigation systems are available that provide end users with various navigation-related functions and features. For example, some navigation systems are able to determine an optimum route to travel along a road network from an origin location to a destination location in a geographic region. Using input from the end user, the navigation system can examine various potential routes between the origin and destination locations to determine the optimum route. The navigation system may then provide the end user with information about the optimum route in the form of guidance that identifies the maneuvers required to be taken by the end user to travel from the origin to the destination location. Some navigation systems are able to show detailed maps on displays outlining the route, the types of maneuvers to be taken at various locations along the route, locations of certain types of features, and so on.

In order to provide these and other navigation-related functions and features, navigation systems use geographic data. The geographic data may be in the form of one or more geographic databases that include data representing physical features in the geographic region. The geographic database includes information about the represented geographic features, such as one-way streets, position of the roads, speed limits along portions of roads, address ranges along the road portions, turn restrictions at intersections of roads, direction restrictions, such as one-way streets, and so on. Additionally, the geographic data may include points of interests, such as businesses, facilities, restaurants, hotels, airports, gas stations, stadiums, police stations, landmarks, and so on.

A landmark may be an entity having a physical presence (e.g., a building, a sign, a sculpture, an entity that is perceptible through vision, touch, or sound) that the user will encounter while traveling a route dictated by the directions. In one implementation, a landmark is a branded reference point that designates a place of business or the location of at least one business, commercial signage, or an advertisement. In one implementation, symbols or marks (e.g., trademarks) representing landmarks can be included in the map view and/or the directions view. In an aspect of this implementation, landmark symbols in the directions view may correspond to like symbols in the map view.

Driving directions can be helpful if in addition to spatial information, landmark or other contextual information is provided. Landmarks and other contextual information relating to the route assist in adding context to directions as well as allowing for a greater likelihood of success of an operator following directions. There can be employment of physical identification of landmarks as well as processing regarding the utility of a landmark in regards to driving directions. Driving directions can be highly useful if integrated landmarks relate to knowledge possessed by an operator of a vehicle. Landmark based driving direction can be integrated with advertisements that relate to the directions.

For example, although navigation systems provide many important features, there continues to be room for new features and improvements. One area in which there is room for improvement relates to providing guidance to follow a route. Typically, route guidance identifies maneuvers to be taken at specified locations, such as turn left at next intersection. Some end users may get confused as to their orientation and where to turn. Accordingly, it would be beneficial to provide improved guidance to follow a route. More particularly, it would be beneficial to consider details in the end user's environment and context to provide a more natural, environmental and intuitive guidance message and/or instructions based on contextual elements surrounding the road segment. Such enhanced guidance may be referred to as natural guidance, and natural guidance may be defined as a turn-by-turn experience encompassing multiple attributes and relations which details the user's environment and context, e.g. landmarks, to more natural, environmental and intuitive triggers. Guidance messages formed using natural guidance may provide details of contextual elements, such as landmarks, surrounding decision points such as points of interest, cartographic features and traffic signals and/or stop signs. An example of a guidance message using natural guidance is "go past the dome building on your right, then turn right after the petrol station."

To allow the navigation system to provide natural guidance information, a geographic database developer collects information relating to the geographic features of the geographic region useful for providing guidance instructions that are more natural, provide additional environmental context and are more intuitive. For example, a geographic researcher may travel the geographic region to collect information relating to geographic features. As the geographic research travels the geographic region, images and/or video of the road network and the area surrounding the road are collected and stored on a storage medium. The geographic research collects information directly when traveling in the geographic region and/or collects information after traveling in the geographic region by later examining the video and images. Alternatively, or in addition thereto, the geographic researcher may use aerial images to collect information Generally, natural guidance based systems aim to act more like a human navigator, pointing out many more visual cues like recognizable buildings, traffic signals, landmarks, and the like that might help drivers respond more intuitively than the typical "turn in 300 meters" sort of instructions a typical navigation device usually provides.

For example, NAVTEQ Natural Guidance, manufactured by Nokia Corporation, located in Finland, improves upon linear navigation instructions—e.g. 'turn right in 50 meters on Kurfuerstendamm—by guiding the way humans instruct each other, through descriptions of orientation points such as distinctive points of interest and landmarks—e.g. 'turn right after the yellow shop" or 'turn right at the traffic signal.' Research shows consumers desire more intuitive and practical directions because it is easier to follow and allows the user to keep their eyes on the road. NAVTEQ Natural Guidance enables applications to use recognizable and easily understandable points of reference close to the decision point to highlight the next maneuver.

DETAILED DESCRIPTION

The disclosed embodiments relate to recognition of navigation and/or guidance related information within an expressed conversational narrative between a provider of the narrative and a receiver thereof. The recognized navigation and/or guidance related information is then converted into navigation data which may be used, such as by a navigation device or application, to present a navigation route and/or guidance information related thereto to the receiver.

In particular, the recognition that humans may understand, or otherwise prefer, "natural guidance", as described above, better than typical event based, e.g. turn by turn, guidance stems from the way humans generally communicate such information among themselves. For example, one person, such as someone new to a particular geographic area, may ask for directions to a destination from another person, such as someone who lives or works in the particular geographic locale. The provider of the directions may then describe the route by which the receiver of the directions should travel to arrive at the destination. This conversation, referred to herein as a conversational narrative, may include an oral narrative, a manual or gestural narrative, such as hand waving, finger pointing or drawing, or a combination thereof.

While guidance via such a conversational narrative typically accomplishes the goal of guiding the receiver to their desired destination, and in fact has successfully done so long before modern navigation systems were developed, it is not without its shortcomings. For example, the receiver of the directions must follow along with the provider and must remember and/or memorialize the directions. If the provider is speaking fast or using quick or ambiguous gestures, it may be difficult for the receiver to follow along and they may miss or otherwise forget important portions of the directions. Further, language, cultural differences, and other semantic ambiguities common to human communication and expression, may make it difficult for the direction provider to adequately explain the route/guidance and/or may make it difficult for the direction receiver to adequately understand the route/guidance.

Figure 1:
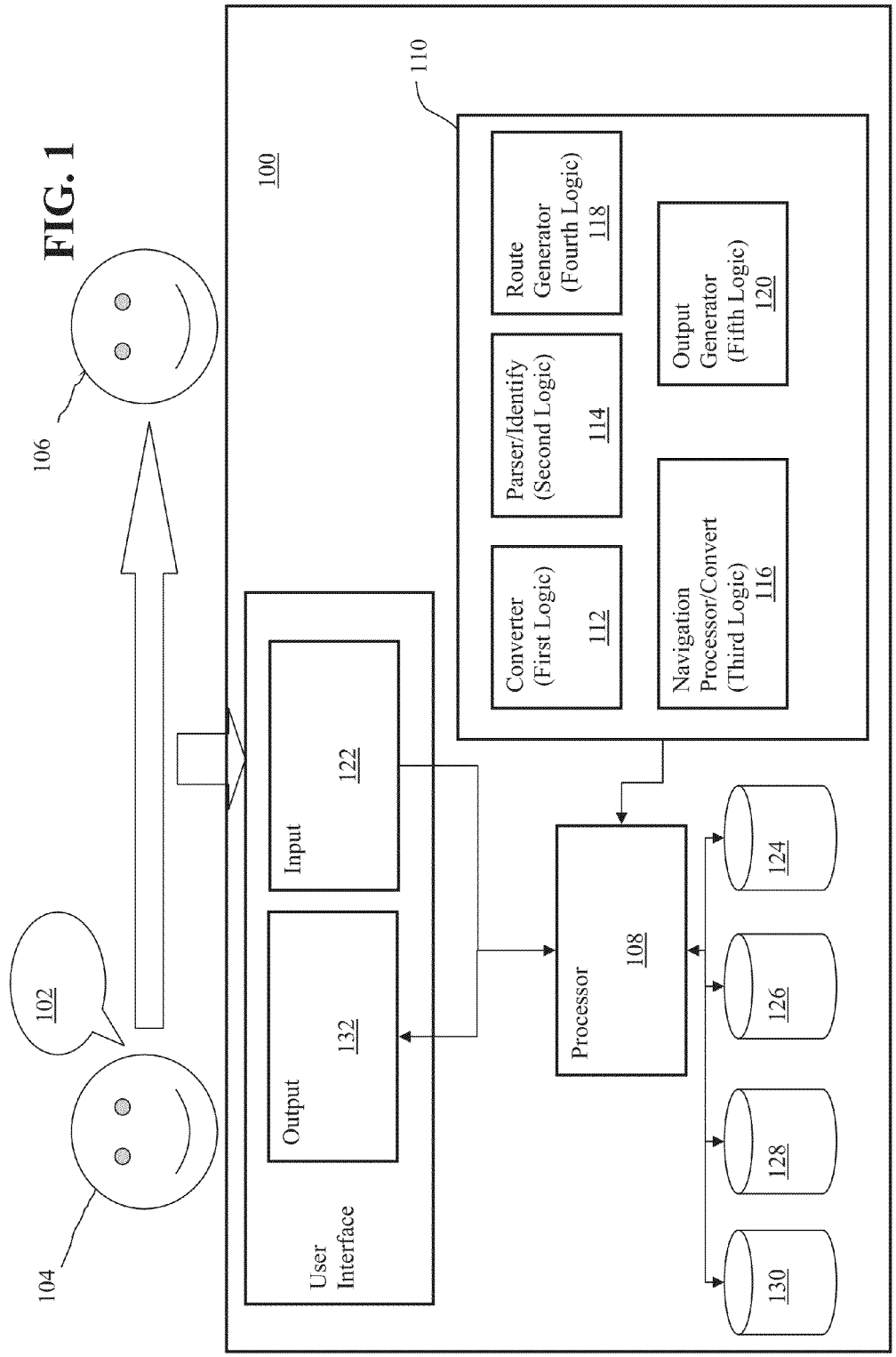
FIG. 1 is a block diagram of an exemplary implementation of the system for facilitating navigation of a route based on a conversational narrative descriptive of a route to a destination expressed by a provider to a receiver.

FIG. 1 shows a system 100 for facilitating navigation of a route based on a conversational narrative 102 descriptive of a route to a destination expressed by a provider 104, e.g. a human who has been asked for, or otherwise prompted to provide, navigation directions, to a receiver 106, e.g. a human being who has asked for, or is otherwise receiving, directions from the provider 102. The conversational narrative 102 may include a natural spoken language and/or gestures, which may or may not be commonly understood among the provider 104 and the receiver 106. The conversational narrative 102 may be occurring in real time, i.e. concurrent with the processing thereof by the system 100, as will be described below, or be pre-recorded or otherwise provided in advance. The conversational narrative 102 may not be comprehensible by a computer. The destination may be a geographic destination and may be expressed in terms of a landmark located at the destination, a street address, street intersection, region, coordinates, altitude, floor level, or a combination thereof. The destination may further be a location within a public or private premises, such as a building, room or office or a location on a particular floor there within Examples of conversational narratives may include directions from a present location to the nearest gas station or directions to a bathroom within a building.

Generally the disclosed system 100 converts and/or transcribes the audible/vocalized and/or non-verbal gestures of the conversational narrative 102 to generate navigable data therefrom and compile a navigation route which the receiver 106 may then utilize to navigate to the destination. The system 100 may ensure that little or no information is lost in translation.

The system 100 includes a processor 108 and a memory 110 coupled therewith which may be implemented by one or more of the processor 302 and memory 304 as described below with respect to FIG. 3. In particular, the system 100 may be implemented, at least in part, in a mobile device, such as a cellular telephone, smart phone, mobile navigation device or tablet computing device. Further, one or more parts of the system 100 may be implemented in a server, e.g. remote from the mobile device, coupled with the mobile device via a network, such as a wired or wireless network, or combination thereof, e.g. the network 320 described below with respect to FIG. 3.

Herein, the phrase "coupled with" is defined to mean directly connected to or indirectly connected through one or more intermediate components. Such intermediate components may include both hardware and software based components. Further, to clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superseding any other implied definitions herebefore or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

The system 100 further includes first logic 112 stored in the memory 110 and executable by the processor 108 to cause the processor 108 to receive at least a portion of the expressed conversational narrative 102, such as via an input 122, comprising a plurality of conversational elements, wherein the plurality of conversational elements include a plurality of navigation oriented conversational elements and at least one descriptive element characterizing, e.g. describing or relating among, at least one other of the plurality of conversational elements. For example, the conversational narrative 102 "Head east until you pass the gas station then turn right and go a mile or so until you see an oak tree on your left, turn left and the restaurant will be 10 minutes further just over the hill" may be determined to include navigation oriented elements "head east", "pass the gas station", "turn right", "go a mile", "turn left", etc. The descriptive elements may be determined to include "or so", "see an oak tree on your left", "just over the hill", etc.

The conversational narrative 102 may be expressed vocally, with gestures, or a combination thereof. In particular, the conversational elements, whether vocally and/or gesturally expressed, of the conversational narrative 102 may include one or more navigation oriented conversational elements which specify a route, a starting location, a destination location, a relative direction, a heading, a cardinal direction, a change to direction, a way point, a landmark, a distance, a range, a street name, a spatial description, a temporal description, a contextual characterization, a generalization, a subjective characterization, or combinations thereof. Further, wherein the conversational narrative 102 may include at least a portion of which is a vocal or verbally expressed narrative, the input 122 may include a microphone or other audio sensor and the first logic 112 may be further executable by the processor 108 to cause the processor 108 to receive the conversational narrative via the audio sensor input 122 and convert the received conversational narrative 102 to data representative thereof, such as via a speech recognition algorithm executed by the processor 108. It will be appreciated that, as the conversational narrative 102 comprises natural human communication as was described above, the narrative may include at least one utterance, exaggeration, embellishment, description, slang word, accent, term of art, dialect, cultural reference, or combination thereof. Further, the conversational narrative 102 may be characterized by a tone, tempo, or combination thereof, and which may or may not vary throughout the conversational narrative 102. In addition, the conversational narrative 102 may be expressed a spoken or written language different than a language spoken or read by the receiver 106 of the conversational narrative 102.

Wherein the conversational narrative 102, or a portion thereof, includes a gestural, e.g. non-verbal, narrative, the input 122 may include one or more sensors adapted to receive and convert the gestural narrative to data representative thereof, such as an optical sensor, e.g. a camera, a motion sensor, e.g. an accelerometer, a touch or tactile sensor, e.g. infrared or capacitive sensor, a proximity sensor, or a combination thereof. Accordingly the first logic 112 may be further executable by the processor 108 to cause the processor 108 to receive the gesturally expressed conversational narrative 102, or portion thereof, via the input 122 and convert, e.g. via a converter, the received conversational narrative to data representative thereof. It will be appreciated that gestures which make up a gestural narrative may include at least one physical movement of a portion of a human body, such as pointing with a finger or other body part, waving, a mannerism, lip movement, eye movement, drawing, such as pictures, maps, symbols, text, etc., in the air, on paper or on a touch sensitive input, etc. Where the mobile device is moved along with the body movement, motion sensors, accelerometers, etc. may detect and convert the movement to digital data representative thereof. Alternatively, or in addition thereto, a camera or other optical sensor may capture images or other optical information indicative of one or more gestures and covert them to digital data representative thereof. For example, where a conversational narrative 102 comprises "head that way" coupled with the provider pointing their finger, or otherwise pointing the mobile device, north, the gesture portion of the narrative may include the cardinal direction north with the resulting navigation route generally consisting of "travel north."

It will be appreciated that the system 100 may operate in a manner so as to gather as much of the conversational narrative 102 as possible via any of the available sensor inputs. Accordingly, though the system 100 may be capable of receiving gesture based input, if the device on which the system 100 is implemented in located in the pocket of the receiver 106, for example, only the audio input may be capable of receiving that portion of the conversational narrative 102. The system 100 would then operate only on that portion of the conversational narrative 102. In one embodiment, the system 100 may indicate to the user thereof, the level of accuracy or confidence attained in the resultant navigation route based on the amount of the conversational narrative 102 which was able to be captured.

The system 100 further includes a parser which may be implemented as second logic 114 stored in the memory 110 and executable by the processor 108 to cause the processor 108 to identify the navigation oriented conversational elements of the plurality of conversational elements which are related to navigation as well as any of the at least one descriptive elements characterizing thereof, e.g. describing the navigation oriented element or otherwise relating together a navigation oriented element with another conversational element. In one embodiment, speech recognition algorithms may be implemented to convert the conversational narrative 102 to data representative thereof, such as digital representations of the sound patterns or movements. The data representative of the conversational narrative 102 may then be parsed, such as based on a grammatical and/or semantic rule set, to identify semantic elements thereof, such as words, clauses, phrases, concepts or other expressive elements of the conversational narrative 102. The identified elements may then be processed, such as by comparing them with a dictionary database to identify those elements having a navigation orientation. Using the grammatical/semantic rule set, other elements which further characterize, e.g. describe or relate, the navigation oriented elements may be identified. The second logic 114 may be further executable by the processor 108 to cause the processor 108 to further detect the tone and/or tempo of the vocal portion of the conversational narrative 102 and covert the detected tone and/or tempo, and/or variations therein, to data representative thereof.

The system 100 further includes a navigation processor which may be implemented as third logic 116 stored in the memory 110 and executable by the processor 108 to cause the processor 108 to convert, or otherwise correlate, each of the plurality of navigation oriented conversational elements into an associated navigation data element representative thereof based on the identified descriptive and relational elements. Navigation data elements may include coordinates, street addresses, street names, intersections, landmarks, points of interest, etc. The descriptive and relational elements may include directions, distances, magnitudes, relationships, or combinations thereof. In one embodiment, the processor 108 may be coupled with a navigation database 124 which includes navigation data related to one or more geographic regions, including cartographic data such as street names, addresses, way points, landmarks, points of interest, etc. Wherein the conversational narrative 102 is expressed in a particular spoken or written language or otherwise comprises at least one utterance, exaggeration, embellishment, description, slang, accent, term of art, dialect, cultural reference, or combination thereof, the third logic 116 may be further executable by the processor 108 to cause the processor 108 to accommodate therefore when converting the plurality of navigation oriented conversational elements. In one embodiment, the processor 108 may be further coupled with a language database 126 comprising translations of different languages to a common language or other common digital representation, such as English and further comprises translations of slang words, terms of art, cultural references, exaggerative words, embellishments, etc. to normalized and/or standardized terms. Accent or dialect comprehension data may be provided which allows for normalization of recognized speech prior to conversion. Similarly, the processor 108 may be coupled with a gestural database 128 which provides for translation, or otherwise normalization, of gestures into digital representations thereof. The processor 108 may be suitably programmed to process the conversational narrative 102 so as to normalize the elements thereof prior to identifying and converting the navigation oriented conversational elements, and other elements related thereto, to navigation data elements. Accordingly, the third logic 116 may be further executable by the processor 108 to cause the processor 108 to translate each of the navigation oriented conversational elements, interpolate between two or more of the navigation oriented conversational elements, extrapolate from one or more of the navigation oriented conversational elements, or combinations thereof. The third logic 116 may be further executable by the processor 108 to cause the processor 108 to access the navigation database 124 so as to relate one or more navigation oriented conversational elements to one or more navigation data elements.

The system 100 further includes fourth logic 118 stored in the memory 110 and executable by the processor 108 to cause the processor 108 to compile the navigation data elements into a navigation route. For example, the processor 108 may compile all of the identified streets, directions, way points, etc. to achieve a complete navigable route from the specified starting location to the destination location. As will be described, wherein the conversational narrative 102 includes implied elements, such implied elements may be resolved by the system 100 during or prior to the compilation of the navigation route.

The system 100 further includes an output 132 and/or output generator which may be implemented as fifth logic 120 stored in the memory 110 and executable by the processor 108 to cause the processor 108 to present at least a portion of the navigation route, such as audibly present via oral directions conveyed over a sound output 132 device coupled therewith, e.g. a speaker, wired or wireless headset or other Bluetooth device, visually present, such as by using a map image, directional indicators, written directions, etc. via a visual display device 132 coupled therewith, e.g. a display screen, tactically present via vibration or other tactile indication devices 132, or a combination thereof, the navigation route or a portion thereof. The navigation route may be presented in its entirety, such as via a map our route overview, or in portions, such as maneuver by maneuver and may further be presented in real time as the route is navigated. The navigation route may be specified in terms of maneuvers for walking to the destination, driving to the destination, utilizing public transit or combinations thereof, with the determination being based automatically on the context in which the conversational narrative 102 is occurring, cues within the conversational narrative 102, e.g. "walk over here then get on the #2 bus", or a manual selection thereof. In one embodiment, wherein the conversational narrative 102 comprises a spoken language different than a language spoken by the receiver of the conversational narrative 102, the fifth logic 120 may be further executable by the processor to cause the processor to present the navigation route in a manner comprehendible by the receiver of the conversational narrative 102, such as audibly in the spoken language understood by the receiver 106.

It will be appreciated that the system 100 may operate in real time (or substantially in real time), generating the navigation route as the conversational narrative 102 is occurring wherein, as additional details are expressed by the narrative 102, the presented navigation route is updated to reflect the additional detail. Further, the conversational narrative 102 may include corrective expressions intended to make corrections to the presented navigation route, with the system 102 recognizing and implementing the corrections expressed thereby to revise the presented navigation route. For example, where the conversational narrative comprises "turn left at the corner, wait, no, I mean turn right at the corner", the system 102 may first present a left turn maneuver at the particular location and then correct the presentation to show a right turn instead reflecting the correction.

As the conversational narrative 102, as described above, includes natural human communication and expression, the narrative 102 may include at least one implied navigation oriented conversational element such as an omitted, ambiguous, inaccurate, incomplete, grammatically miss-specified, irrelevant, incorrect, contradictory, misleading, or a combination thereof, element. For example, the provider 102 may fail to mention a particular turn or may give an incorrect direction. As will be described, the system 100 may be further operative to discern or otherwise derive implied navigation elements from, for example, other portions of the conversational narrative. For example, the system 100 may compare identified navigation oriented conversational elements against each other and/or against the navigation database to identify and/or correct for inconsistencies therein, apply an assessment of the tone and/or tempo of the conversational narrative 102, interpolate between and/or extrapolate from the navigation oriented conversational elements. In one embodiment, the starting and/or ending locations may be identified and used to independently determine one or more navigation routes there between. These independently generated navigation routes may then be compared with the navigation route compiled based on the conversational narrative and used to fill in any missing information, correct for any errors or ambiguities, validate or otherwise contextualize the compiled navigation route.

In one embodiment, the third logic 116 is further executable by the processor 108 to cause the processor 108 to derive the at least one implied navigation oriented element from a context in which the conversational narrative is occurring. For example, the context may include one of the geographic location, e.g. regional or specific in which the conversational narrative is occurring as may be derived from a GPS device or the like, a temporal characteristic such as the time of day, season, or other navigation oriented element, such as current direction of travel, or combinations thereof.

In one embodiment, the third logic 116 is further executable by the processor 108 to cause the processor 108 to derive the at least one implied navigation oriented element based on a demographic attribute of the provider of the conversational narrative. Demographic attributes may include the ethnicity of the provider 102 or the geographic region in which the provider 102 lives. This may allow, for example, to the processor 108 to account for different languages, dialects, regional or cultural references, etc.

In one embodiment, the third logic 116 is further executable by the processor 108 to cause the processor 108 to derive an associated navigation data element associated with the at least one implied navigation oriented element based on a contextual profile 130 of the provider 102 of the conversational narrative, a contextual profile 130 of the receiver 106 of the conversional narrative, or a combination thereof. The contextual profile 130, which may also be referred to as a comprehension or understanding profile, may include attributes of the associated provider 102 or receiver 106, such as demographic information. The contextual profile 130 may further include specific attributes of the particular associated provider 102 or receiver 106, such as commonly used phrases or gestures. The contextual profile 130 may be generated and updated automatically or may be manually created and updated. In one embodiment, a user may be provided with a generic contextual profile 130 which they may then customize. Alternatively, or in addition thereto, the contextual profile 130 maybe automatically updated so as to "learn" attributes of the associated user. For example, in one embodiment, the first logic 112, or alternatively, the third logic 116, may be further executable by the processor 108 to cause the processor 108 to receive corrections to the derived associated navigation data element and update the contextual profile 130 based thereon. Is this way, the provider 102 may make corrections as the navigation route is compiled and presented. The navigation route is then updated based on the corrections and the contextual profile 130 may be further updated to reflect the changes for application to future navigation.

In operation, the system 100 may be implemented on a mobile device of the provider 102 and/or the receiver 106. For example, the provider 102 may use their device to generate and present the navigation route to the receiver. In one embodiment, the provider 102 may then cause their mobile device to transmit the navigation route to the receiver's mobile device. In one embodiment, to facilitate proper generation of the navigation route, the receiver 102 may cause their contextual profile 130, or a portion thereof, to be transmitted, such as via Bluetooth, Wi-Fi or near field communication, to the mobile device of the provider 106 for use thereby. In another embodiment, all of the processing except for the presentation of the navigation route may occur on the device of the provider 102, in conjunction with a remote server or not, where the generated navigation route is then transmitted to the device of the receiver 106 for presentation thereby. Alternatively, the receiver 106 may utilize their mobile device, whether or not in conjunction with a remote server, to generate and present the navigation route based on the conversational narrative 102. In one embodiment, to facilitate proper generation of the navigation route, the provider 102 may cause their contextual profile 130, or a portion thereof, to be transmitted, such as via Bluetooth, Wi-Fi or near field communication, to the mobile device of the receiver 106 for use thereby.

In one embodiment, given the inaccurate and/or unreliability of natural language and human communication, the system 100 may further implement algorithms which, for example, detect hesitancy, lack of confidence and/or deception, and generate confidence levels and/or recommendations to the receiver 106 as to the accuracy or reliability of the navigation route or portions thereof. As was described above, the compiled navigation route may be further compared with an independently generated route to the destination to further assess the reliability of the provider 104 and/or the conversational narrative 102.

Figure 2:
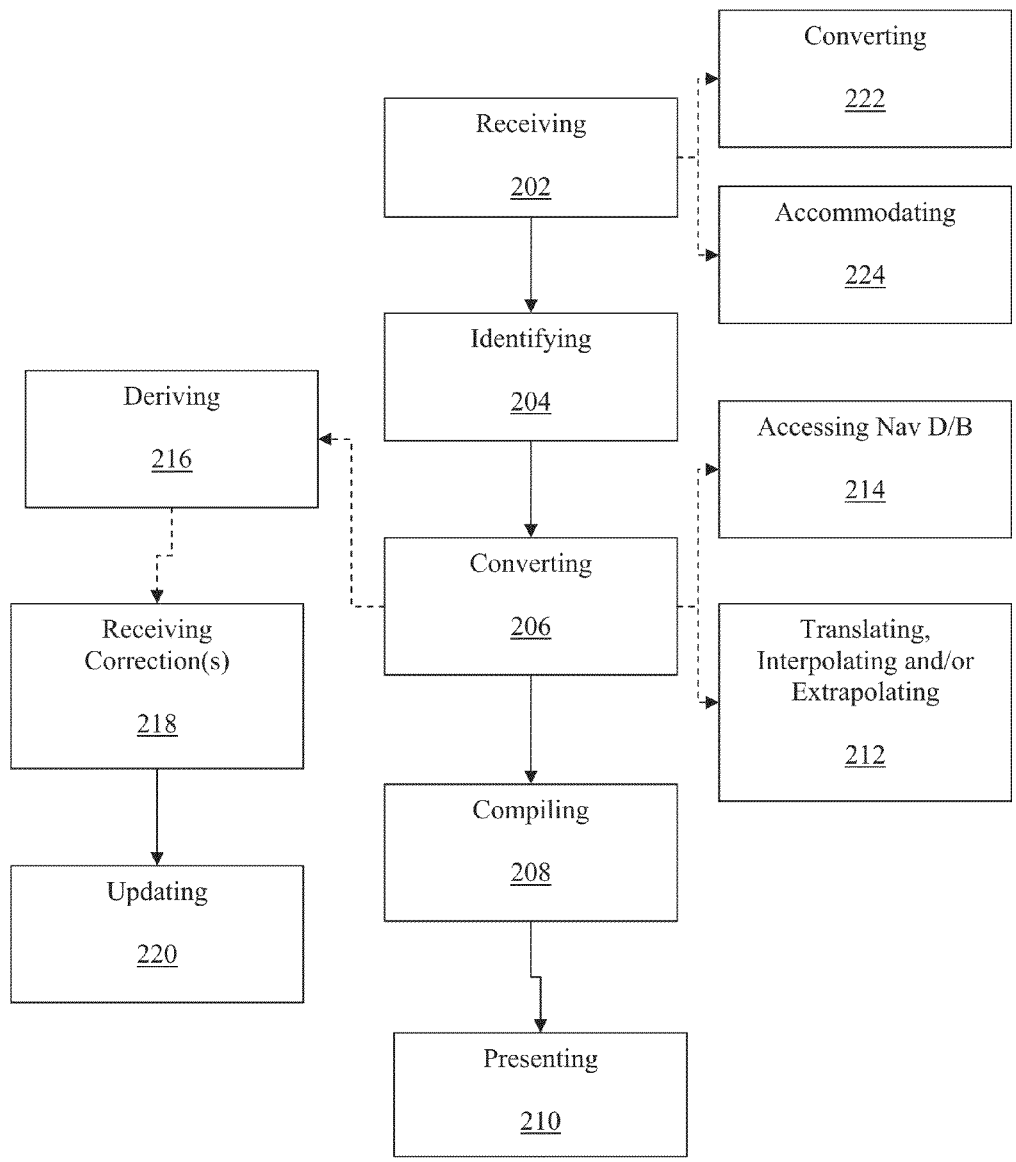
FIG. 2 depicts a flow chart showing operation of the system of FIG. 1.

FIG. 2 depicts a flow chart showing operation of the system 100 of FIG. 1. In particular FIG. 2 shows a computer implemented method for navigation of a route based on a conversational narrative descriptive of a route to a destination expressed by a provider to a receiver which may be performed, at least in part, on a device of the provider, the receiver or a combination thereof. The operation includes: receiving, by a processor, at least a portion of the expressed conversational narrative comprising a plurality of conversational elements, wherein the plurality of conversational elements includes a plurality of navigation oriented conversational elements and at least one descriptive element characterizing at least one other of the plurality of conversational elements [block 202]; identifying, by the processor, the plurality of navigation oriented conversational elements of the plurality of conversational elements as well as any of the at least one descriptive elements characterizing thereof [block 204]; converting, by the processor, each of the plurality of navigation oriented conversational elements into an associated navigation data element representative thereof based on the identified descriptive elements [block 206]; compiling, by the processor, the navigation data elements into a navigation route [block 208]; and presenting, by the processor, at least a portion of the navigation route [block 210].

The conversational narrative may include a natural spoken language, one or more gestures, or a combination thereof and may be received in real time. Further, the conversational narrative may not be comprehensible by a computer but the navigation route may be comprehensible by a computer. The conversational elements of the conversational narrative may specify a route, a starting location, a destination location, a relative direction, a heading, a cartographic direction, a change to direction, a way point, a landmark, a distance, a range, a street name, a spatial description, a temporal description, a contextual characterization, a generalization, a subjective characterization, or combinations thereof.

In one embodiment, the converting may further include translating each of the navigation oriented conversational element, interpolating between two or more of the navigation oriented conversational elements, extrapolating from one or more of the navigation oriented conversational elements, or combinations thereof [block 212].

In one embodiment, the converting may further include accessing a navigation database operative to relate one or more navigation oriented conversational elements to one or more navigation data elements [block 214].

In one embodiment, the destination comprises an interior destination of a public or private premises.

The conversational narrative may further include at least one implied navigation oriented conversational element wherein the at least one implied navigation oriented conversational element may be one of omitted, ambiguous, inaccurate, incomplete, grammatically miss-specified, irrelevant, incorrect, contradictory, misleading or a combination thereof. In one embodiment, the operation of the system 100 further includes deriving, by the processor, the at least one implied navigation oriented element from an independently generated navigation route to the destination [block 216]. Alternatively, or in addition thereto, the operation of the system 100 may further include deriving, by the processor, the at least one implied navigation oriented element from a context in which the conversational narrative is occurring [block 216] wherein the context may include one of a geographic location, other navigation oriented element, temporal characteristic, or combinations thereof. Alternatively, or in addition thereto, the operation of the system 100 may further include deriving, by the processor, the at least one implied navigation oriented element based on a demographic attribute of the provider of the conversational narrative [block 216]. Alternatively, or in addition thereto, the operation of the system 100 may further include deriving, by the processor, an associated navigation data element associated with the at least one implied navigation oriented element based on a contextual profile of the provider of the conversational narrative, a contextual profile of the receiver of the conversational narrative, or a combination thereof [block 216]. The operation of the system 100 may further include receiving, by the processor, corrections to the derived associated navigation data element [block 218] and updating the contextual profile based thereon [block 220].

Wherein the conversational narrative comprises a vocal narrative, the operation of the system 100 may further include receiving, by the processor, the conversational narrative via an audio sensor coupled therewith [block 202] and converting the received conversational narrative to data representative thereof [block 222]. The conversational narrative may include at least one utterance, exaggeration, embellishment, description, slang, accent, term of art, dialect, cultural reference, or combination thereof, the converting may further include accommodating, by the processor, therefore [block 224]. The conversational narrative may be characterized by a tone, tempo, or combination thereof.

Wherein the conversational narrative comprises a spoken language different than a language spoken by the receiver of the conversational narrative, the operation of the system 100 may further include presenting, by the processor, the navigation route in a manner comprehendible by the receiver of the conversational narrative [block 210].

Wherein the conversational narrative comprises a gestural narrative, the operation of the system 100 may further include receiving, by the processor, the conversational narrative via an optical sensor, a motion sensor, a touch sensor, a proximity sensor, or a combination thereof, coupled therewith [block 202] and converting, by the processor, the received conversational narrative to data representative thereof [block 222]. The conversational narrative may include at least one physical movement of a portion of a human body.

In one embodiment, the presenting may include audibly presenting, visually presenting, tactically presenting, or a combination thereof [block 210].

Figure 3:
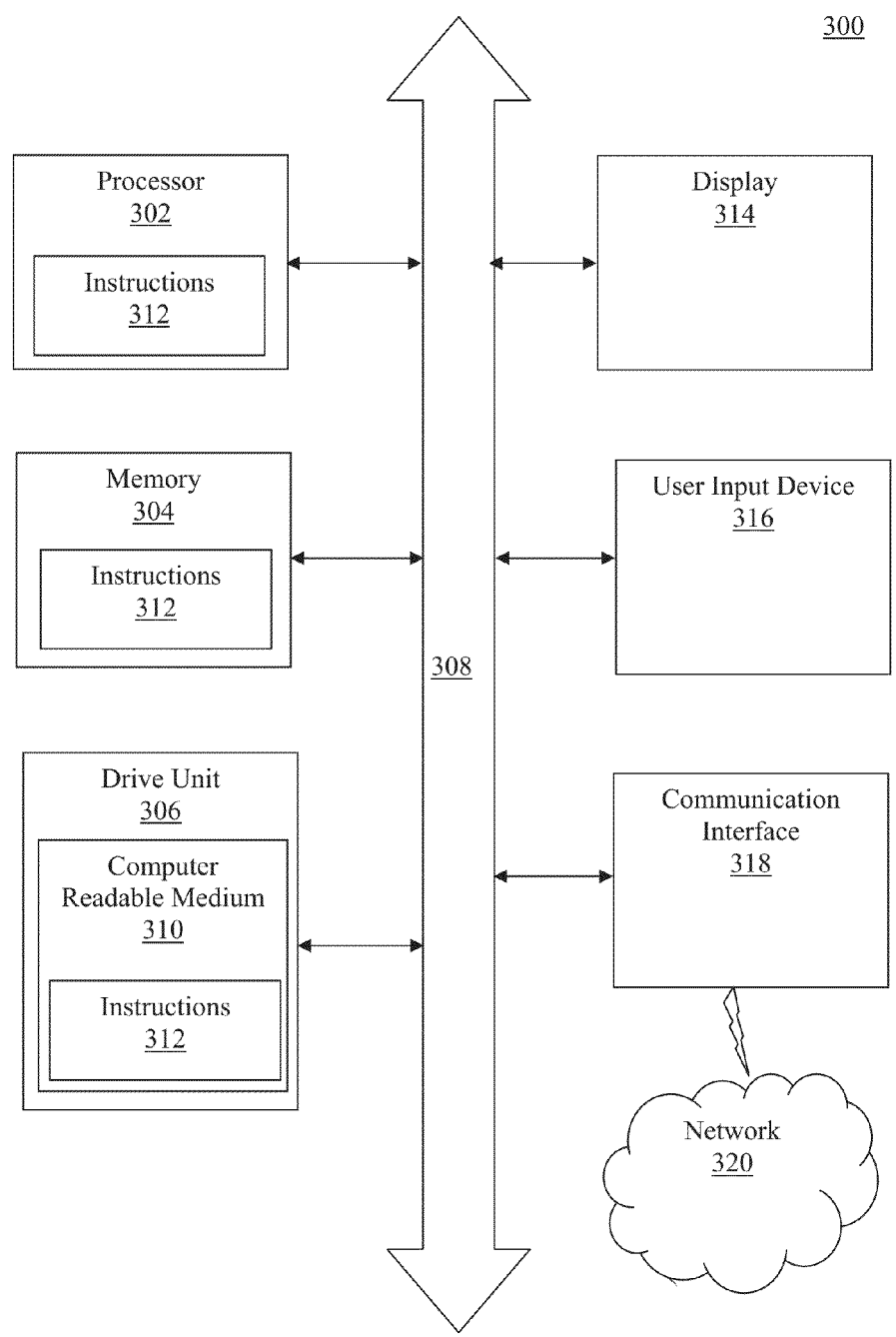
FIG. 3 shows an illustrative embodiment of a general computer system for use with the system of FIG. 1.

Referring to FIG. 3, an illustrative embodiment of a general computer system 300 is shown. The computer system 300 can include a set of instructions that can be executed to cause the computer system 300 to perform any one or more of the methods or computer based functions disclosed herein. The computer system 300 may operate as a standalone device or may be connected, e.g., using a network, to other computer systems or peripheral devices. Any of the components discussed above, such as the processor 108, may be a computer system 300 or a component in the computer system 300. The computer system 300 may implement a navigation system, of which the disclosed embodiments are a component thereof.

In a networked deployment, the computer system 300 may operate in the capacity of a server or as a client user computer in a client-server user network environment, or as a peer computer system in a peer-to-peer (or distributed) network environment. The computer system 300 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 300 can be implemented using electronic devices that provide voice, video or data communication. Further, while a single computer system 300 is illustrated, the term "system" shall also be taken to include any collection of systems or sub-systems that individually or jointly execute a set, or multiple sets, of instructions to perform one or more computer functions.

As illustrated in FIG. 3, the computer system 300 may include a processor 302, e.g., a central processing unit (CPU), a graphics processing unit (GPU), or both. The processor 302 may be a component in a variety of systems. For example, the processor 302 may be part of a standard personal computer or a workstation. The processor 302 may be one or more general processors, digital signal processors, application specific integrated circuits, field programmable gate arrays, servers, networks, digital circuits, analog circuits, combinations thereof, or other now known or later developed devices for analyzing and processing data. The processor 302 may implement a software program, such as code generated manually (i.e., programmed).

The computer system 300 may include a memory 304 that can communicate via a bus 308. The memory 304 may be a main memory, a static memory, or a dynamic memory. The memory 304 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one embodiment, the memory 304 includes a cache or random access memory for the processor 302. In alternative embodiments, the memory 304 is separate from the processor 302, such as a cache memory of a processor, the system memory, or other memory. The memory 304 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 304 is operable to store instructions executable by the processor 302. The functions, acts or tasks illustrated in the figures or described herein may be performed by the programmed processor 302 executing the instructions 312 stored in the memory 304. The functions, acts or tasks are independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

As shown, the computer system 300 may further include a display unit 314, such as a liquid crystal display (LCD), an organic light emitting diode (OLED), a flat panel display, a solid state display, a cathode ray tube (CRT), a projector, a printer or other now known or later developed display device for outputting determined information. The display 314 may act as an interface for the user to see the functioning of the processor 302, or specifically as an interface with the software stored in the memory 304 or in the drive unit 306. A tactile output may further be provides such a mechanical or piezoelectric vibration motor.

Additionally, the computer system 300 may include an input device 316 configured to allow a user to interact with any of the components of system 300. The input device 316 may be a number pad, a keyboard, or a cursor control device, such as a mouse, or a joystick, touch screen display, remote control, accelerometer, motion sensor, proximity sensor, optional sensor, e.g. a camera, or any other device operative to interact with the system 300.

In a particular embodiment, as depicted in FIG. 3, the computer system 300 may also include a disk or optical drive unit 306. The disk drive unit 306 may include a computer-readable medium 310 in which one or more sets of instructions 312, e.g. software, can be embedded. Further, the instructions 312 may embody one or more of the methods or logic as described herein. In a particular embodiment, the instructions 312 may reside completely, or at least partially, within the memory 304 and/or within the processor 302 during execution by the computer system 300. The memory 304 and the processor 302 also may include computer-readable media as discussed above.

The present disclosure contemplates a computer-readable medium that includes instructions 312 or receives and executes instructions 312 responsive to a propagated signal, so that a device connected to a network 320 can communicate voice, video, audio, images or any other data over the network 320. Further, the instructions 312 may be transmitted or received over the network 320 via a communication interface 318. The communication interface 318 may be a part of the processor 302 or may be a separate component. The communication interface 318 may be created in software or may be a physical connection in hardware. The communication interface 318 is configured to connect with a network 320, external media, the display 314, or any other components in system 300, or combinations thereof. The connection with the network 320 may be a physical connection, such as a wired Ethernet connection or may be established wirelessly as discussed below. Likewise, the additional connections with other components of the system 300 may be physical connections or may be established wirelessly.

The network 320 may include wired networks, wireless networks, or combinations thereof. The wireless network may be a cellular telephone network, an 802.11, 802.16, 802.20, or WiMax network. Further, the network 320 may be a public network, such as the Internet, a private network, such as an intranet, or combinations thereof, and may utilize a variety of networking protocols now available or later developed including, but not limited to TCP/IP based networking protocols.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. While the computer-readable medium is shown to be a single non-transitory medium, the term "computer-readable medium" includes a single non-transitory medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein. The computer readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a)hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is therefore intended that the foregoing detailed description be regarded as illustrative rather than limiting, and that it be understood that it is the following claims, including all equivalents, that are intended to define the spirit and scope of this invention.

What is claimed is:

1. A computer implemented method comprising:
   receiving, by a processor, at least a portion of a conversational narrative descriptive of a route to a destination expressed by a provider, the expressed conversational narrative comprising a plurality of conversational elements, a portion of which includes at least one non-verbal physical movement of a portion of a human body, wherein the plurality of conversational elements includes a plurality of navigation oriented conversational elements and at least one descriptive element characterizing at least one other of the plurality of conversational elements;
   receiving, by the processor, the portion of the conversational narrative comprising the at least one non-verbal physical movement of a portion of a human body via an optical sensor, a motion sensor, or a combination thereof, coupled therewith;
   identifying, by the processor, the plurality of navigation oriented conversational elements of the plurality of conversational elements as well as any of the at least one descriptive elements characterizing thereof;
   converting, by the processor, each of the plurality of navigation oriented conversational elements into an associated navigation data element representative thereof based on the identified descriptive elements;
   compiling, by the processor, the navigation data elements into a navigation route; and
   presenting, by the processor, at least a portion of the navigation route.

2. The computer implemented method of claim 1 wherein the converting further comprises accessing a navigation database operative to relate one or more of the plurality of navigation oriented conversational elements to one or more navigation data elements.

3. The computer implemented method of claim 1 wherein the conversational narrative further comprises at least one implied navigation oriented conversational element wherein the at least one implied navigation oriented conversational element is one of omitted, ambiguous, inaccurate, incomplete, grammatically miss-specified, irrelevant, incorrect, contradictory, misleading or a combination thereof.

4. The computer implemented method of claim 3 further comprising deriving, by the processor, an associated navigation data element associated with the at least one implied navigation oriented element based on a contextual profile of the provider of the conversational narrative.

5. The computer implemented method of claim 1 wherein the conversational narrative comprises a vocal narrative including a spoken natural language the method further comprising receiving, by the processor, the conversational narrative via an audio sensor coupled therewith and converting the received conversational narrative to data representative thereof.

6. The computer implemented method of claim 1 wherein the at least one non-verbal physical movement of a portion of a human body comprises pointing with a finger or other body part, waving, a mannerism, lip movement, eye movement, drawing a picture, drawing a map, drawing symbols, drawing text, or combinations thereof.

7. A system comprising:
   a processor;
   a memory coupled with the processor;
   first logic stored in the memory and executable by the processor to cause the processor to receive at least a portion of a conversational narrative descriptive of a route to a destination expressed by a provider, the expressed conversational narrative comprising a plurality of conversational elements, a portion of which includes at least one non-verbal physical movement of a portion of a human body, wherein the plurality of conversational elements includes a plurality of navigation oriented conversational elements and at least one descriptive element characterizing at least one other of the plurality of conversational elements, the first logic being further executable by the processor to cause the processor to receive the portion of the conversational narrative comprising the at least one non-verbal physical movement of a portion of a human body via an optical sensor, a motion sensor, or a combination thereof;
   second logic stored in the memory and executable by the processor to cause the processor to identify the plurality of navigation oriented conversational elements of the plurality of conversational elements as well as any of the at least one descriptive elements characterizing thereof;
   third logic stored in the memory and executable by the processor to cause the processor to convert each of the plurality of navigation oriented conversational elements into an associated navigation data element representative thereof based on the identified descriptive and relational elements;
   fourth logic stored in the memory and executable by the processor to cause the processor to compile the navigation data elements into a navigation route; and
   fifth logic stored in the memory and executable by the processor to cause the processor to present at least a portion of the navigation route.

8. The system of claim 7 wherein the third logic is further executable by the processor to cause the processor to access a navigation database operative to relate one or more navigation oriented conversational elements to one or more navigation data elements.

9. The system of claim 7 wherein the conversational narrative comprises at least one implied navigation oriented conversational element wherein the at least one implied navigation oriented conversational element is one of omitted, ambiguous, inaccurate, incomplete, grammatically miss-specified, irrelevant, incorrect, contradictory, misleading or a combination thereof.

10. The system of claim 9 wherein the third logic is further executable by the processor to cause the processor to derive the at least one implied navigation oriented element from a context in which the conversational narrative is occurring wherein the context comprises one of a geographic location, other navigation oriented element, temporal characteristic, or combinations thereof.

11. The system of claim 9 wherein the third logic is further executable by the processor to cause the processor to derive an associated navigation data element associated with the at least one implied navigation oriented element based on a contextual profile of the provider of the conversational narrative.

12. The system of claim 7 wherein the conversational narrative comprises a vocal narrative including a spoken natural language, the first logic being further executable by the processor to cause the processor to receive the conversational narrative via an audio sensor and convert the received conversational narrative to data representative thereof.

13. The system of claim 7 wherein the at least one non-verbal physical movement of a portion of a human body comprises pointing with a finger or other body part, waving, a mannerism, lip movement, eye movement, drawing a picture, drawing a map, drawing symbols, drawing text, or combinations thereof.

14. A mobile device comprising:
an input operative to receive at least a portion of a conversational narrative descriptive of a route to a destination expressed by a provider, wherein the conversational narrative includes a plurality elements, a portion of which includes at least one non-verbal physical movement of a portion of a human body, the plurality of elements including a plurality of navigation oriented elements and at least one descriptive element characterizing another of the plurality of elements, the input being further operative to receive the portion of the conversational narrative comprising the at least one non-verbal physical movement of a portion of a human body via an optical sensor, a motion sensor, or a combination thereof;
a converter coupled with the input and operative to convert the received portion of the expressed conversational narrative to data representative thereof;
a parser coupled with the converter and operative to identify the plurality of navigation oriented conversational elements represented within the data, as well as any descriptive elements associated therewith;
a navigation processor coupled with the parser and operative to convert each of the plurality of navigation oriented conversational elements into an associated navigation data element representative thereof based on the identified descriptive elements associated therewith, if any;
a route generator coupled with the navigation processor and operative to compile the navigation elements into a navigation route; and
an output coupled with the route generator and operative to present the navigation route.

15. The mobile device of claim 14 wherein the navigation processor is further coupled with a navigation database operative to relate one or more navigation oriented conversational elements to one or more navigation data elements.

16. The mobile device of claim 14 wherein the conversational narrative comprises at least one implied navigation oriented conversational element wherein the at least one implied navigation oriented conversational element is one of omitted, ambiguous, inaccurate, incomplete, grammatically miss-specified, irrelevant, incorrect, contradictory, misleading or a combination thereof.

17. The mobile device of claim 16 wherein the navigation processor is further operative to derive an associated navigation data element associated with the at least one implied navigation oriented element based on a contextual profile of the provider of the conversational narrative.

18. The mobile device of claim 14 wherein the conversational narrative comprises a vocal narrative, the input being operative to receive the conversational narrative via an audio sensor and convert the received conversational narrative to data representative thereof.

19. The mobile device of claim 14 wherein the at least one non-verbal physical movement of a portion of a human body comprises pointing with a finger or other body part, waving, a mannerism, lip movement, eye movement, drawing a picture, drawing a map, drawing symbols, drawing text, or combinations thereof.

20. The mobile device of claim 14 wherein the output is operative to audibly present, visually present, tactically present, or a combination thereof, the navigation route or a portion thereof.

* * * * *